I. GOODSPEED.
Garden-Trellis.

No. 166,766. Patented Aug. 17, 1875.

attest: Charles Thurman, R. N. Dyer.

Inventor: Isaac Goodspeed by Geo. W. Dyer & Co. Attys

UNITED STATES PATENT OFFICE.

ISAAC GOODSPEED, OF GREENVILLE, CONNECTICUT.

IMPROVEMENT IN GARDEN-TRELLISES.

Specification forming part of Letters Patent No. 166,766, dated August 17, 1875; application filed March 22, 1875.

*To all whom it may concern:*

Be it known that I, ISAAC GOODSPEED, of Greenville, in the county of New London and State of Connecticut, have invented a new and Improved Garden-Trellis; and I do hereby declare that the following is a full and exact description of the same, reference being had to the accompanying drawings and to the letters of reference marked thereon.

The object I have in view is the construction of a garden-trellis that will be strong and durable, and will protect the end of the trellis from decay; and my invention consists in subdividing boards of the proper length and thickness into separate strips, and keying these strips the proper distance apart, and in any desired shape by cross-pieces that are notched at intervals to receive the strips and hold them in place, and one or more pins near the lower ends of the strips, which are driven through them to hold them firmly together; and, further, in providing the bottom of the trellis with a metallic clip, which incloses the lower ends of the strips and converges to a point to protect the trellis from decay and form a convenient point for sticking into the ground, all as more fully hereinafter described.

To enable others skilled in the art to manufacture my device, I shall now proceed to describe the same in connection with the drawings, in which—

Figure 1:
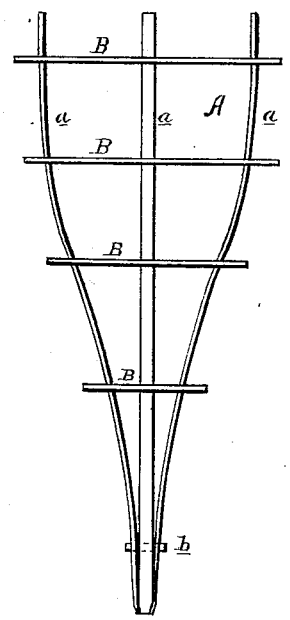
Figure 2:
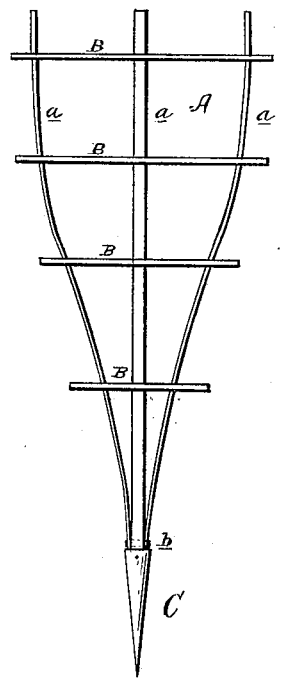
Figure 4:
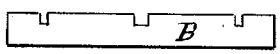
Figure 3:
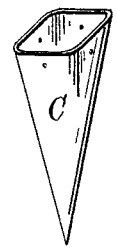

Figure 1 represents an elevation of the trellis with the metallic clip removed. Fig. 2 represents an elevation of the trellis complete; Fig. 3, a separate view of the metallic cap; and Fig. 4, a side elevation of one of the cross-pieces.

Like letters denote corresponding parts in each figure.

A represents the trellis, composed of the upright strips *a*, the central one of which is straight, the others being bent into any desired form. The strips *a* are brought together at the bottom and secured by one or more pins, *b*. B represents the cross-pieces, which are notched to hold the strips from springing either way. The notches heretofore have been cut in the strips and the cross-pieces inserted in the notches, which necessitates the making of the strips larger and thicker to acquire the necessary strength, and thus does away with one of the principal features of a trellis—lightness—and the strips are held apart only by the spring of the wood, while in this case the cross-pieces act as keys in holding the parts from springing either way after once being put in position. It is obvious that the strips could be made square or any other form, and the cross-pieces made broad enough to admit of a hole being punched through them, and have the strips put through the holes instead of in the notches, which would effect the same result without departing from the spirit of my invention. A metallic clip, C, is placed on the ends of the strips, and is secured in any desired way, either by punching in one or all sides, or by driving it onto the strips tight enough to hold itself. This clip protects the lower end of the trellis from decay, and forms a very convenient point to enter the ground.

The following is considered to be the readiest and best method of manufacturing these trellises: Take a board or plank of the thickness to make the right width of the strips of any particular size of trellis; saw it into proper lengths for a certain height, and then saw into strips of the proper width. Thus any number of strips can be sawed without regard to any particular number of trellises, as all the strips of one size of trellis are all the same. Sometimes, however, it is better to make the central strip larger than the rest to support and make the trellis more rigid. For the keys or cross-pieces boards of proper width are sawed into lengths for the different cross-pieces. All these lengths of the same dimension are then grooved, after which they are cut or sawed into the right width for the cross-pieces. Lay the cross-pieces of different sizes on a table the proper distance apart, and lay a rib in the central grooves. Then spring the side-strips into the slots until all are in place. The lower ends of the strips are then brought together and secured by one or more pins driven through them. The end is sharpened and the metallic clip put on, when the trellis is ready for use. I do not wish to confine myself to any number of strips, cross-pieces, or pins, as it is obvious that a trellis could be made with a more or less number than shown by me.

I am aware that it is not new to make a trellis by partially subdividing strips of boards into rectangular strips and bars, and fastening these subdivisions together in various curved forms by notching the curved uprights and securing them with cross-pieces by the spring of the curved parts. I am also aware that a fence-post has been capped with a metallic clip to protect it from decay, and for other purposes; and I hereby disclaim the same; but—

What I do claim as my invention, and desire to secure by Letters Patent, is—

The combination of the strips $a$, notched cross-pieces B, pins $b$, and metallic clip C, substantially as and for the purpose set forth.

This specification signed and witnessed this 18th day of March, 1875.

ISAAC GOODSPEED.

Witnesses:
LOUISE M. HESS,
AMELIA J. POLLARD.